United States Patent [19]

Hieda

[11] Patent Number: 5,659,358
[45] Date of Patent: Aug. 19, 1997

[54] IMAGE PICKUP DEVICE WITH DIGITAL SIGNAL PROCESSING FOR REDUCING SIGNAL DISTORTION

[75] Inventor: Teruo Hieda, Yokohama, Japan

[73] Assignee: Canon Kabushiki Kaisha, Tokyo, Japan

[21] Appl. No.: 204,704

[22] Filed: Mar. 2, 1994

[30] Foreign Application Priority Data

Mar. 5, 1993 [JP] Japan .................................. 5-044948

[51] Int. Cl.$^6$ ...................................................... H04N 5/20
[52] U.S. Cl. ............................................ 348/255; 348/256
[58] Field of Search ........................ 348/222, 234, 348/255, 256, 257, 266, 679, 572, 689, 678, 690, 691, 692; 358/41, 174; H04N 5/228, 9/68, 5/20

[56] References Cited

U.S. PATENT DOCUMENTS

| 4,345,270 | 8/1982 | Nagumo | 348/254 |
| 4,620,222 | 10/1986 | Baba | 348/254 |
| 5,293,225 | 3/1994 | Nishiyama | 348/256 |

*Primary Examiner*—Sherrie Hsia
*Attorney, Agent, or Firm*—Morgan & Finnegan, LLP

[57] ABSTRACT

An image pickup device comprises variable gain control circuits 11–13 and 23–25 for respective channels of digital color signals and luminance signals to control the gains by a gain control signal SG. Since the gains are variable in the digital signal channels, the deterioration of the image quality is reduced. The number of input bits of the variable gain control circuits is larger than the number of output bits to minimize the deterioration of the signal due to the loss of digits in coefficient circuits in the variable gain control circuits.

6 Claims, 5 Drawing Sheets

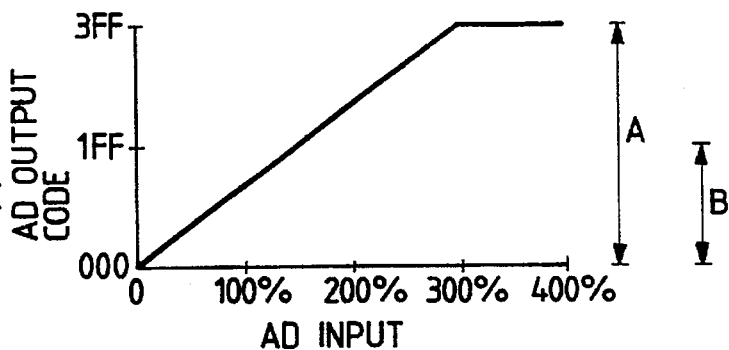
FIG. 2A
AD CHARACTERISTIC
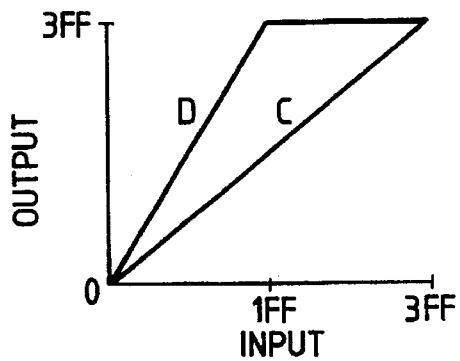
FIG. 2B
GAIN VARIATION CHARACTERISTIC
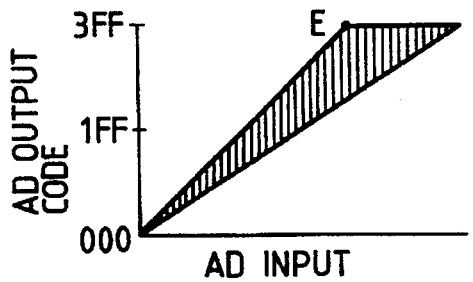
FIG. 2C
COLOR CARRIER CLIP
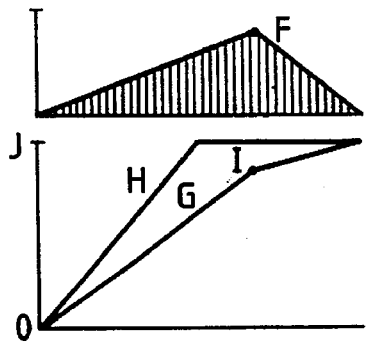
FIG. 2D
COLOR CARRIER
FIG. 2E
Rch
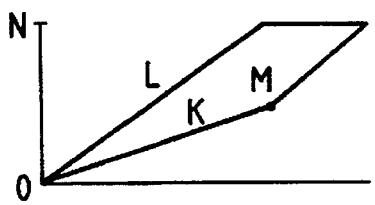
FIG. 2F
Bch

IMAGE PICKUP DEVICE WITH DIGITAL SIGNAL PROCESSING FOR REDUCING SIGNAL DISTORTION

BACKGROUND OF THE INVENTION

1. Field of the Invention

The present invention relates to an image pickup device, and more particularly to an image pickup device for processing a digital signal.

2. Related Background Art

Many proposals have been made heretofore for a single plate color image pickup system, that is, a system in which an output signal from a single solid state image pickup device having a fine color filter arranged on an image pickup plane is processed. In a typical signal processing system thereof, a carrier component due to a color signal is eliminated by an output of a color image pickup device to produce a luminance signal, the carrier component is synchronously detected to separate the color signal, and the color signal and the luminance signal are separately gamma-processed and clipped to compose a video signal.

The size reduction and the weight reduction of the image pickup device which uses the single plate color image pickup system have been advanced as the recent electronics technologies develop. Among others, as the semiconductor technologies develop, a high speed analog-to-digital converter (AD converter) and a digital-to-analog converter (DA converter) are put into practice and a proposal has been made for a system which uses those technologies to digitize an output signal of the image pickup device such as a CCD and process the digital signal.

Namely, the color image pickup signal is analog-to-digital converted so that the filtering, the color separation and the signal processing such as the gamma processing, matrix processing and clipping are conduced in digital form, and they are digital-to-analog converted by a DA converter to produce a video signal.

However, in the image pickup device using the digital signal processing proposed in the prior art, a circuit used in an analog system is simply substituted by a digital system. As a result, a circuit scale is large, the number of components is large, a consumed current is large and the compaction of the device is not attained or the cost reduction is not attained Further, in the prior art system, since a configuration thereof is not optimized for a digital system, a false outline is produced due to a quantization error which is inherent to the digital system or an over-range error, and the deterioration of a frequency characteristic and the reduction an image quality such as the reduction of a dynamic range occur.

Further, since a gain of a signal system is varied not by a digital signal but by an analog signal, a dynamic range is lowered, a non-linearity distortion is produced, a frequency characteristic is deteriorated, a circuit scale is increased and a consumed current is increased.

SUMMARY OF THE INVENTION

It is an object of the present invention to provide an image pickup device having less reduction of an image quality.

In order to achieve the above object, the preferred embodiments of the present invention are constructed as described below.

(1) An image pickup device for digitally processing a digital image pickup signal which is analog-to-digital converted from an output signal of a color image pickup device to produce a video signal, comprising:

variable gain control means for varying gains of channels of color signals separated from the digital image pickup signal and luminance signals; and gain control signal generation means for generating a signal to control the gains of said variable gain control means.

(2) An image pickup device according to (1) wherein the number of input bits is larger than the number of output bits.

By the arrangements (1) and (2), the gains of the respective channels of the color signal and the luminance signals are controlled by the gain control signal. In the arrangement (2), the deterioration of the signal due to the loss of digits in varying the gain is minimized.

The other objects and features of the present invention will be apparent from the following description of the invention and the accompanying drawings.

BRIEF DESCRIPTION OF THE DRAWINGS

FIGS. 2A to 2F illustrate operations of the first embodiment,

DETAILED DESCRIPTION OF THE PREFERRED EMBODIMENTS

Figure 1:
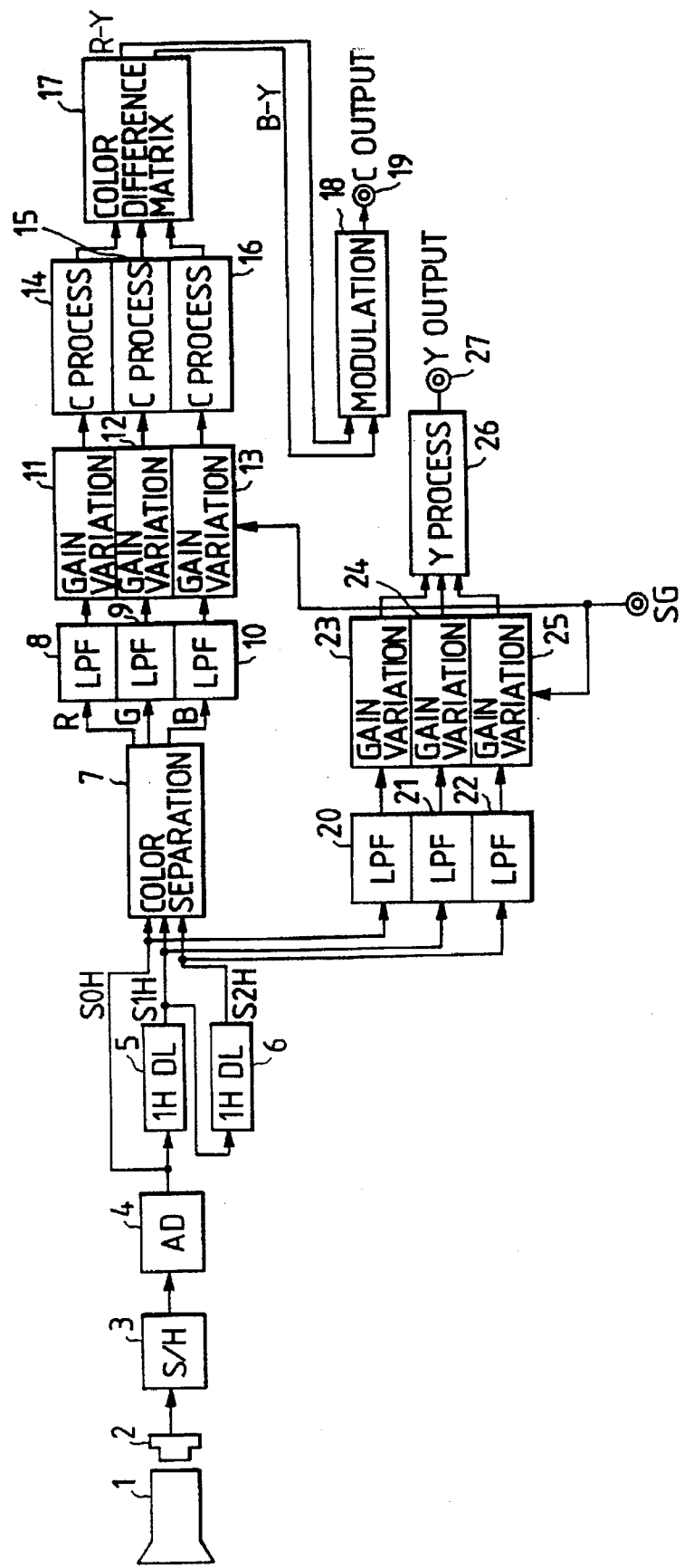
FIG. 1 shows a block diagram of a first embodiment.

FIG. 1 shows a block diagram of an image pickup device in accordance with a first embodiment of the present invention.

In FIG. 1, numeral 1 denotes a lens which is an image pickup optical system, numeral 2 denotes a CCD which is a color image pickup device having a fine color filter arranged on an image pickup plane, numeral 3 denotes a sample and hold circuit for serializing an output of the CCD 2, numeral 4 denotes an AD converter, numerals 5 and 6 denotes 1H-delay lines (1HDL) for delaying input signals thereto by one horizontal period (1H), respectively, numeral 7 denotes a color separation circuit for separating color signals R, G and B from a current signal S0H, a 1H -delayed signal S1H and a 2H-delayed signal S2H, numerals 8, 9 and 10 denote low pass filters (LPF's) in a color signal band, numerals 11, 12, 13, 23, 24 and 25 variable gain control circuits for varying gains of the signal channels in accordance with a gain control signal SG, numerals 14, 15 and 16 denote C-processing circuits for conducting gamma correction and white and black clipping, numeral 17 denotes a color difference matrix for producing color difference signals R-Y and B-Y from the signals R, G and B, numeral 18 denotes a modulator for modulating the color difference signals to color sub-carriers to produce a chrominance signal C, numeral 19 denotes a C signal output terminal numerals 20, 21 and 22 denotes an LPF in a luminance signal band, numeral 26 denotes a luminance (Y) processing circuit for conducting outline correction, gamma correction and white and black clipping, and numeral 27 denotes a Y signal output terminal.

An image of an object, not shown, is focused on the imaging plane of the CCD 2 through the lens 1 and it is color-decomposed by the fine color filter and photo-electrically converted to a color image signal, which is serialized by the sample and hold circuit 3 and it is converted to a digital image signal S0H by the AD converter 4.

The digital image signal S0H is delayed by 1H by the signal 1HDL 5 to produce S1H, and further delayed by 1H by the 1HDL 6 to produce the signal S2H. The signals S0H, S1H and S2H are supplied to the color separation circuits 7 and color-decomposed the color signals R, G and B by the synchronous detection circuit and the matrix processing circuit. The low band signals are taken out of the LPF's 8, 9 and 10 and they are gain-controlled by the variable gain control circuits 11, 12 and 13 in accordance with the gain control signal SG and processed by the C processing circuits 14, 15 and 16. The outputs therefrom are supplied to the color difference matrix circuit 17 which produces a color difference signal which is modulated by a color sub-carrier by the modulator 18 to produce a chrominance signal C, which is outputted from the C signal output terminal 19 as a digital chrominance signal to an external equipment, not shown, or digital-analog converted by a DA converter, not shown, and outputted to an external equipment.

The signals S0H, S1H and S2H are also supplied to the LPF's 20, 21 and 22 which pass the luminance band and the outputs thereof are supplied to the variable gain control circuits 23, 24 and 25 which control the gains in accordance with the gain control signal SG. The outputs therefor processed by the Y processing circuit 26 and outputted from the Y output terminal 27 to the external equipment as the C signal is. The gain control signal SG may be set by an operator in accordance with an image pickup condition or an object, or it may be set by control signal generating means, not show, to a value matching to conditions such as the image pickup condition, a lens diaphragm or a signal level.

FIGS. 2A to 2F illustrate operations of the present embodiment. FIG. 2A shows an input/output characteristic of the AD converter 4. An abscissa represents a percentage to a standard input signal level, and an ordinate represents an output code, which is a 10-bit code in the present example. When the input signal is 300%, a full scale code 3FF is generated, and when the input signal is larger, the output does not change representing a clipping characteristic. A letter A on the right side represents an effective code range when the gains of the variable gain control circuits 11, 12, 13, 23, 24 and 25 are 1. In this case, all codes are effective. A letter B represents an effective code range when the gains of the variable gain control circuits 11, 12, 13, 23, 24 and 25 are 2. In this case, ½ of the full scale is effective.

FIG. 2B shows an input/output characteristic of the variable gain control circuits 11, 12, 13, 23, 24 and 25. An abscissa represents an input and an ordinate represents an output. C represents a characteristic when the gain is 1, and D represents a characteristic when the gain is 2. In D, the output is full scale when the output of the AD converter 4 is ½ of the full scale, and exhibits a limit characteristic thereafter.

FIG. 2C shows an input/output characteristic of the AD converter 4 when a colored object image is picked up. An input signal carries a color carrier corresponding to a color of the object. As the input signal gradually becomes larger and when a maximum of the color carrier exceeds the full scale of the AD converter, the color carrier is clipped. In FIG. 2C, the color carrier on the right side of a point E is clipped.

In FIG. 2D, only the color carrier component of FIG. 2C is taken out. For the beginning, the color carrier increases as the input increases, but on the right side of a point F corresponding to the point E in FIG. 2C, the color carrier component decreases in spite of the increase of the input. As a result, a distortion occurs in the color signal when the input signal is applied over the point F.

FIG. 2E shows an R output signal of the variable gain control circuit 11 when a red object image is picked up. In FIG. 2E, G represents a characteristic when the gain is 1, H represents a characteristic when the gain is 2, and j represents an output limit level. In G, since the color carrier is clipped as described above, the signal is distorted after a point I. In H, however, the output signal is not distorted because the portion above the J is clipped.

FIG. 2F shows a B output signal of the variable gain control circuit 13. The color of the object of FIG. 2C is red as it is in FIG. 2E. K represents a characteristic when the gain is 1, L represents a characteristic when the gain is 2, and N represents an output limit level. In K, since the color carrier is clipped, a signal is distorted after the point M. In L, however, the output signal is not distorted because the output above N is clipped.

Figure 3:
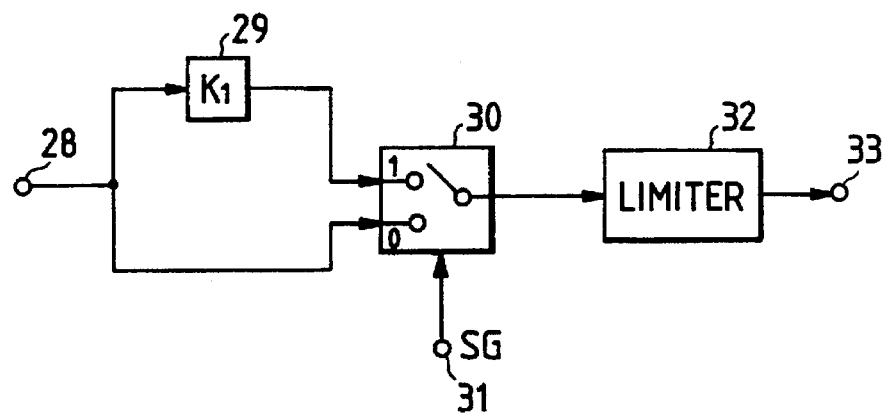
FIG. 3 shows a detail of a variable gain control circuit.

FIG. 3 shows a detail of the variable gain control circuit 11 of FIG. 1. The variable gain control circuits 12 and 13 may be of similar configuration. In FIG. 3, numeral 28 denotes a signal input terminal, numeral 29 denotes a coefficient circuit having a coefficient K1, numeral 30 denotes a switching circuit, numeral 31 denotes an input terminal for the gain control signal SG, numeral 32 denotes a limiter for limiting a signal above a predetermined level, and numeral 33 denotes a signal output terminal.

An input signal is applied to the input terminal 28 and it is multiplied by the coefficient K1 by the coefficient circuit 29. One of the output signal and the input signal is selected by the switching circuit in accordance with the gain control signal SG. The output is applied to the limiter 32 so that a portion above the predetermined level is limited and the limited signal is outputted from the output terminal 33. For example, assuming that K1 is 2 and the switch 30 selects 0 when the SG is 0 and selects 1 when the SG is 1, the input/output gain of the variable gain control circuit 13 is 1 when SG=0 and 2 when SG=1.

The coefficient circuit 29 may have a fixed coefficient or the coefficient may be variable by a multiplier and it may be selected by switching means or in accordance with a diaphragm signal or a signal level.

Figure 4:
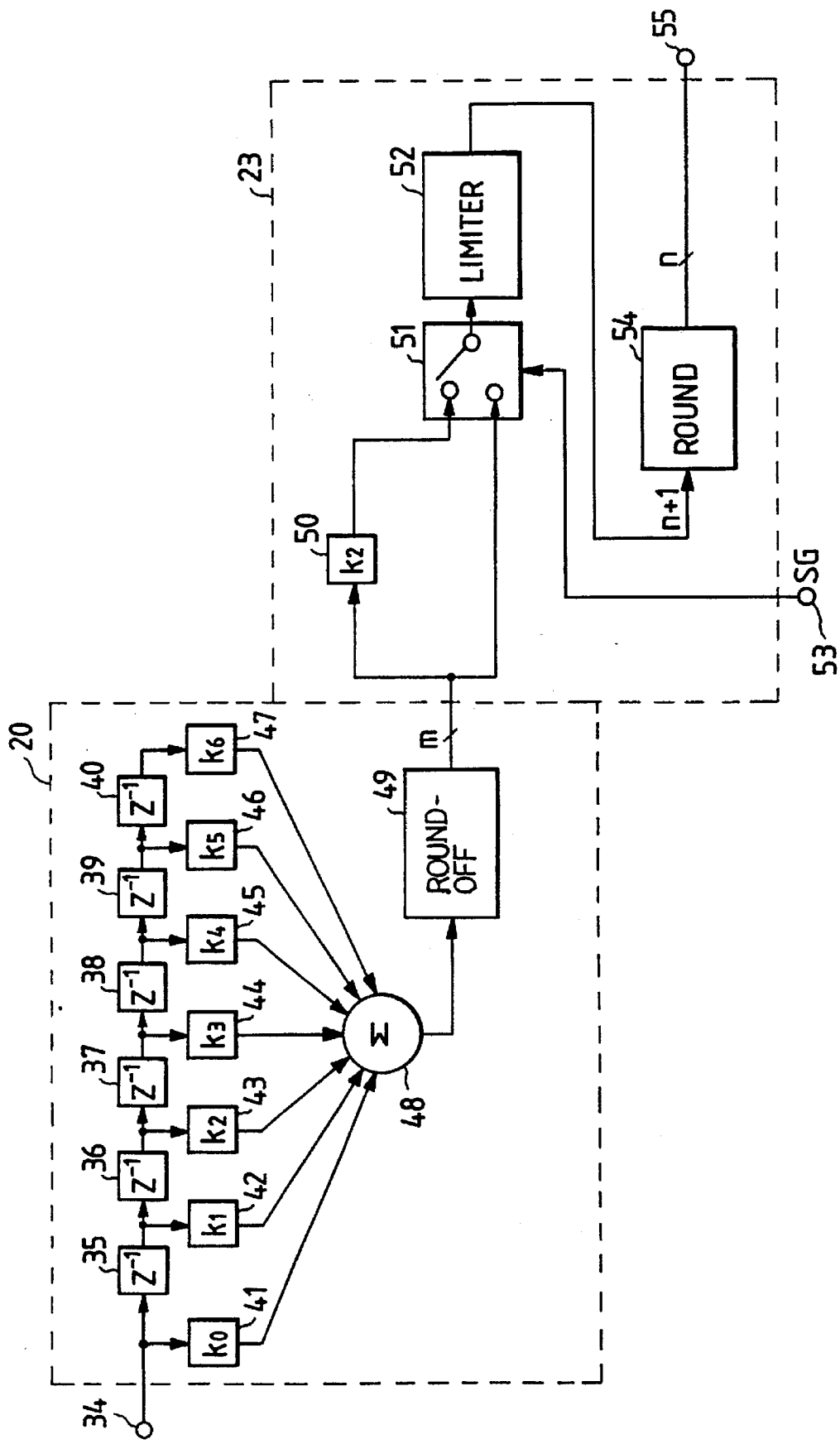
FIG. 4 shows a detail of an LPF 20 and a variable gain control circuit 23.

FIG. 4 shows a detail of the LPF 20 and the variable gain control circuit 23 of FIG. 1. The LPF's 21 and 22, and the variable gain control circuits 24 and 25 may be of similar configuration.

In FIG. 4, numeral 34 denotes an input terminal, numerals 35, 36, 37, 38, 39 and 40 denote delay circuits such as D type flip-flops, numerals 41, 42, 43, 44, 45, 46, 47 and 50 denote coefficient circuits having coefficients k0, k1, k2, k3, k4, k5, k6 and K2, respectively, numeral 48 denotes a summing adder, numeral 49 denotes a round-off circuit for rounding off bits below a predetermined level, numeral 51 denotes a switching circuit, numeral 52 denotes a limiter for limiting a signal above a predetermined input level, numeral 53 denotes an input terminal for the gain control signal SG, numeral 54 denotes a round circuit, and numeral 55 denotes signal output terminal. The components 35, 36, 37, 38, 39, 40, 41, 42, 43, 44, 45, 46, 47, 48 and 49 form the LPF 20, and the components 50, 51, 52, 53, 54 and 55 form the variable gain control circuit 23.

An input signal is applied to the input terminal 34 and it is delayed by the delay circuits 35, 36, 37, 38, 39 and 40, and the respective output signals and the input signals are multiplied by the coefficients k0, k1, k2, k3, k4, k5 and k6, respectively by the coefficient circuits 41, 42, 43, 44, 45, 46 and 47, and the respective outputs are summed by the total sum adder 48 and he output thereof is rounded to m bits by the round circuit 49. The output is multiplied by the coefficient K2 by the coefficient circuit 50, and one of the output of the round circuit 49 and the output of the coefficient circuit 50 is selected in accordance with the control signal SG supplied from the gain control signal input terminal, and the output thereof is limited by the limiter at the predetermined level and the output thereof is rounded to n bits by the round circuit 54 and outputted from the output terminal 55.

Assuming that the bit width of the output signal is n, the input to the round circuit 54 is of n+1 bits.

It meets the following relation with the output bit width m of the round circuit 49.

$$m > n+1$$

In this case, assuming that the gain of K2 is 4, the input is shifted toward the MSB by 2 bits in the coefficient circuit 50. Accordingly, when m is set to n+1+2, the deterioration of the signal by the rounding by the coefficient circuit is minimized. The value m may be selected in accordance with the value K2 so that a similar effect may be attained for other value of K2. For example, $$m = n+1+|\log_2(K2)|$$

where |x| represents an integer equal to or larger than x and smallest.

As a result, the increase of the circuit scale is substantially zero and the deterioration of the signal due to the quantization error is prevented, and the deterioration of the signal due to the cascade connection of the round circuits is also eliminated. Accordingly, the deterioration of the image quality is reduced.

The coefficient circuit 50 may have a fixed coefficient or it may be varied by a multiplier and selected by switching means or in accordance with a diaphragm or a signal level.

Figure 5:
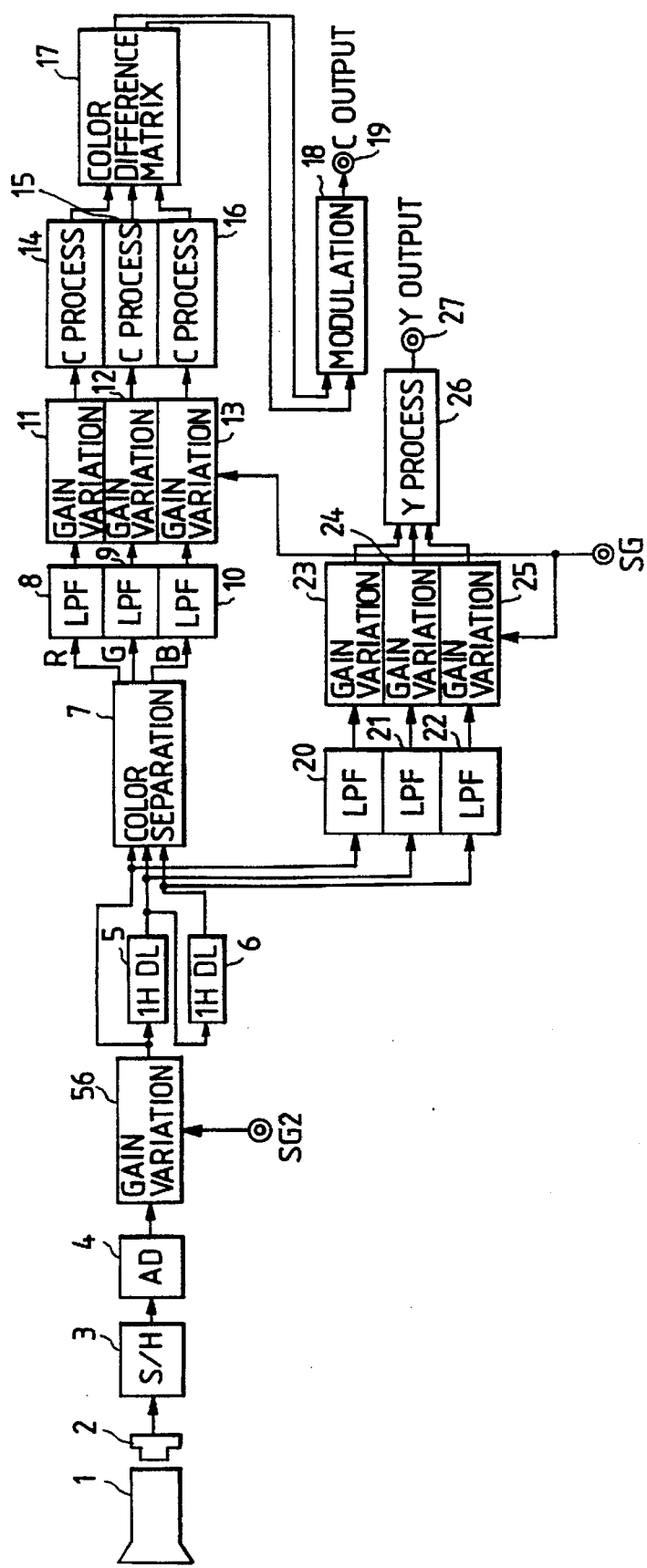
FIG. 5 shows a block diagram of a second embodiment.

FIG. 5 shows a block diagram of a second embodiment of the present invention. Identical or equivalent elements to those shown in the previous embodiment are designated by the like numerals and the explanation thereof is omitted. In FIG. 5, numeral 56 denotes a variable gain control circuit for controlling an input/output gain in accordance with the applied gain control signal SG2.

The output of the AD converter 4 carries a gain by the variable gain control circuit 56 in accordance with the SG2. The output is supplied to the color separation circuit 7, the LPF 20 and the 1HDL 5. The gain control signal SG2 may be generated by an operator by a switch or may be set to a value corresponding to the conditions of the diaphragm of the lens and the signal level and the SG by control signal generation means, not shown.

To compare with the configuration of FIG. 1, the present configuration permits a larger width of a variable range of the gain because two variable gain control circuits are provided. Where a multi-bit AD converter is used and the gain is to be varied by the gain control signal SG, the affect of loss of digits by the increase of the gain can be reduced until a predetermined gain is reached. Accordingly, by properly setting the gain control signals SG and SG2, the deterioration of the image quality in increasing the gain can be minimized.

Figure 6:
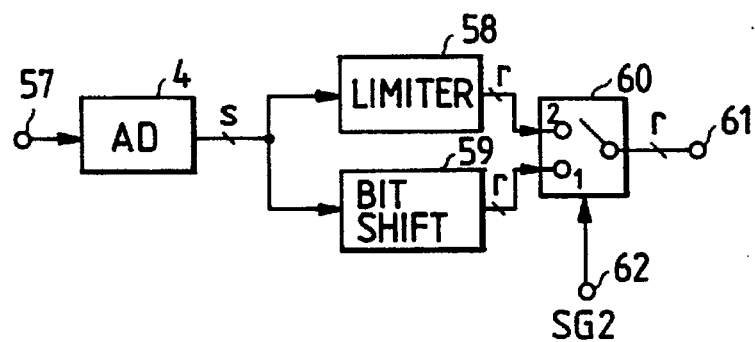
FIG. 6 shows a variable gain control circuit 56.

FIG. 6 shows a detail of the variable gain control circuit 56. In FIG. 6, numeral 57 denotes a signal input terminal, numeral 58 denotes a limiter for limiting a signal above a predetermined input level, numeral 59 denotes a bit shifter for shifting the input signal toward the LSB by a predetermined number of bits, numeral 60 denotes a switching circuit, numeral 61 denotes an signal output terminal and numeral 62 denotes an input terminal for the gain control signal SG2. The limiter 58, the bit shifter 59 and the switching circuit 60 form a variable gain control circuit 56.

A signal applied to the input terminal 57 is converted to a s-bit digital signal by the AD converter 4 and it is limited at the predetermined level by the limiter 58 and shifted toward the LSB by the predetermined number of bits by the bit shifter 59 to produce r-bit signals, respectively, which are selected by the switching circuit 60 in accordance with the signal SG2 supplied from the gain control signal input terminal 62. The output is supplied to the color separation circuit 7, the LPF 20 and the 1HDL 5 from the output terminal 61.

Figure 7:
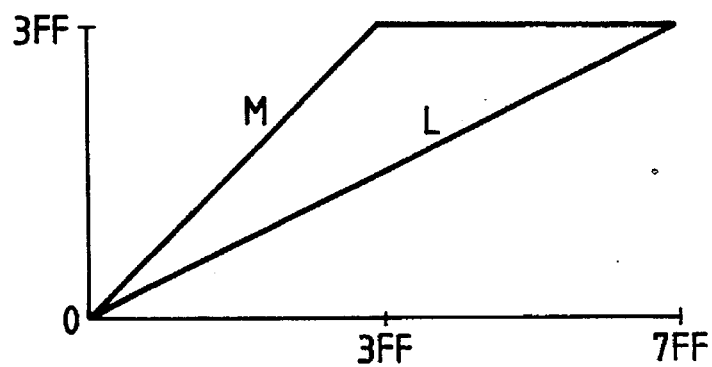
FIG. 7 illustrates an operation of the variable gain control circuit.

FIG. 7 illustrates an operation of FIG. 6. L represents a characteristic when the switch 60 is on the side 1, and m represents a characteristic when it is on the side 2.

When the number s of conversion bits of the AD converter 4 is set to 11, codes 0–7FF are produced. When the number r of output bis of the variable gain control circuit 56 is set to 10 and the shift of the bit shifter 59 is set to 1 bit, the LSB bit of the AD converter 4 is rounded when the switching circuit 60 is on the side 1 and the input is outputted as it is when the switching circuit 60 is on the side 2. Accordingly, the deterioration of the signal due to the loss of digit in the variable gain control circuit 56 is prevented. As a result, an image pickup device of a high image quality is attained.

In accordance with the present invention, the gain may be increased or decreased in accordance with the image pickup condition and the object to be picked up. Further, the deterioration of the image quality in increasing the gain is minimized. In addition, the distortion of the color signal of a high luminance and high chrominance area is reduced.

What is claimed is:

1. An image pickup device for digitally processing a digital image pickup signal which is analog-to-digital converted from an output signal of a color image pickup device to produce a video signal, comprising:

variable gain control means for varying gains of channels of color signals separated from the digital image pickup signal and luminance signals;

gain control signal generation means for generating a signal to control the gains of said variable gain control means; and bits control means for making the number of input bits of said variable gain control means larger than the number of output bits thereof.

2. An image pickup device according to claim 1 wherein the number of input bits of said variable gain control means is larger than the number of output bits thereof.

3. An image pickup device comprising:

a) image pickup means for generating a digital image signal;

b) variable gain control means for controlling a gain of the digital image signal outputted from said image pickup means; and c) bits control means for making the number of input bits of said variable gain control means larger than the number of output bits thereof.

4. An image pickup device according to claim 3 wherein said image pickup means includes an AD converter.

5. An image pickup device according to claim 3 further comprising a digital filter provided before said variable gain control means.

6. An image pickup device according to claim 5 wherein said digital filter includes round means for rounding digits.

* * * * *